United States Patent
Mella et al.

(10) Patent No.: US 7,031,477 B1
(45) Date of Patent: Apr. 18, 2006

(54) VOICE-CONTROLLED SYSTEM FOR PROVIDING DIGITAL AUDIO CONTENT IN AN AUTOMOBILE

(76) Inventors: Matthew Rodger Mella, 2740 Linda Marie Dr., Oakton, VA (US) 22124; Kevin John Caffrey, 2723 Clarkes Landing Dr., Oakton, VA (US) 22124; Daniel Thomas Bagley, 2711 Verily Ct., Oakton, VA (US) 22124

( * ) Notice: Subject to any disclaimer, the term of this patent is extended or adjusted under 35 U.S.C. 154(b) by 765 days.

(21) Appl. No.: 10/054,958

(22) Filed: Jan. 25, 2002

(51) Int. Cl.
*H04B 1/00* (2006.01)
(52) U.S. Cl. .................... 381/86; 369/6; 369/7; 700/94
(58) Field of Classification Search ................ 381/86; 369/6, 7; 455/345; 700/94
See application file for complete search history.

(56) References Cited

U.S. PATENT DOCUMENTS

| | | | |
|---|---|---|---|
| 4,126,827 A * | 11/1978 | Negrini ..................... | 455/90.3 |
| 4,831,610 A * | 5/1989 | Hoda et al. .............. | 369/47.23 |
| 5,722,069 A | 2/1998 | Donner | |
| D407,704 S | 4/1999 | Ichijima et al. | |
| D410,650 S | 6/1999 | Hara | |
| 6,009,355 A | 12/1999 | Obradovich et al. | |
| 6,055,478 A | 4/2000 | Heron | |
| 6,182,006 B1 | 1/2001 | Meek | |
| 2001/0044664 A1* | 11/2001 | Mueller et al. ................ | 700/94 |
| 2001/0048749 A1* | 12/2001 | Ohmura et al. ............... | 381/86 |
| 2005/0020223 A1* | 1/2005 | Ellis et al. ............... | 455/186.1 |

OTHER PUBLICATIONS

White, Gregory, L., *Does A Range of New Gizmos Stop The Question 'Are We There Yet?'*, The Wall Street Journal, Jan. 4, 2002, pp. 1-8, Dow Jones & Company, Inc.
MP3Car, http://www.mp3car.com, 7 pgs., Jul. 15, 2002.
ACNT.com, http://www.acnt.com, 2 pgs., Jul. 15, 2002.

* cited by examiner

*Primary Examiner*—Brian Tyrone Pendleton
(74) *Attorney, Agent, or Firm*—Hunton & Williams LLP

(57) ABSTRACT

A voice-controlled system for providing digital audio content in an automobile is presented. The system comprises a CPU unit that includes a microprocessor programmed to decode and deliver digital media such as MP3s and ebooks to a listener. The CPU unit also includes a storage device for storing the media, RAM and a power supply. The storage device is a "plug-in" unit, such as a hard disc drive, that may be removed and inserted into a home computer for downloading media. The system is controlled using a voice-based input device that interfaces with the CPU unit. The voice-based device is operative to control in a hands-free manner, for example, the selection of the media to be delivered and the volume at which the media is delivered. A display and control unit is suitable for mounting on the dashboard of an automobile and provides an alternative to voice control of the system. The display and control unit also provides a scroll-through list of the available media and information about the media being played such as the title, the artist, the volume at which it is being played and a sound spectrum analysis.

8 Claims, 1 Drawing Sheet

VOICE-CONTROLLED SYSTEM FOR PROVIDING DIGITAL AUDIO CONTENT IN AN AUTOMOBILE

FIELD OF THE INVENTION

The present invention relates generally to a voice-controlled system for providing digital audio content in MP3 format (or other format) in an automobile, the system comprises a CPU unit, a dashboard unit and an input unit wherein the input unit includes a plurality of input devices including a voice activated input for receiving voice commands.

BACKGROUND OF THE INVENTION

The digital music revolution is sweeping the globe. Unfortunately, there are no viable commercial options for bringing a large digital music collection in MP3 format in an automobile while maintaining a simple and easy way to use a control system.

MP3 is a file format for storing audio data on a computer in digital format. MP3 stands for MPEG (Moving Pictures Experts Group) Audio Layer 3. MP3 produces compact disk (CD)-quality music in a compressed file that can be transferred quickly and played on any multimedia computer with a MP3 player. A MP3 player refers to software that allows the user to listen to music or sound in MP3 format. The technology creates sound files a tenth the size of standard CD music files with very little loss of sound quality. As a result, huge numbers of Internet users have taken to trading MP3 files back and forth or posting them on download sites.

MP3 is similar in many ways to audio data contained on any standard compact disc, with at least two main differences. First, a MP3 is a compressed form of CD data. Secondly, while a CD takes a full 650 megabytes for 74 minutes of audio, that same amount of music in MP3 format would take only 74 megabytes. Users may simply convert a CD collection to this easy to manage format for listening on computers and other portable players.

A standard in-dash CD player generally holds about 74 minutes of music before one must repeat the same CD or insert a different CD. In addition, frequent CD changes oftentimes inhibit a listener's ability to safely maneuver an automobile. Generally, a very expensive 12 disc CD-changer holds approximately 14.7 hours of music while current MP3 player technology is very expensive and offers limited features and options.

Therefore, there is a need in the art of MP3 players for a system for providing digital audio content in an automobile with various input features, including a voice-activated option where the system is affordable and easy to use.

SUMMARY OF THE INVENTION

Aspects of the present invention overcome the problems noted above, and realize additional advantages. According to an aspect of the present invention, a fully functional, voice activate digital audio player for the car is presented.

According to an embodiment of the present invention, a system for providing digital audio content in an automobile comprises a central processing unit comprising (a) a microprocessor for decoding and delivering digital audio content; (b) a storage device for storing the digital audio content; (c) a random access memory for storing temporary data for running one or more application programs; (d) a power supply for providing power to the central processing unit, wherein the central processing unit is located in the automobile; an input unit comprising (e) a set of function controls for enabling a user to select one or more digital audio selections; (f) a receiver for receiving input from a remote control device for selecting one or more digital audio selections; and (g) a voice activated input device for receiving voice commands from a user for selecting one or more digital audio selections; wherein the input unit is located proximate to a driver's seat of the automobile; and a dashboard unit comprising a liquid crystal display for displaying media data related to the digital audio content in response to the digital audio selection, wherein the dashboard unit is mounted on a dashboard of the automobile at a location within the user's reach.

Additional features of the present invention further include delivering digital audio content in MP3 format; the input unit further comprising a bar code scanner for selecting one or more digital audio selections; the digital audio content further comprising an electronic book; the digital audio content further comprising video data for display on the liquid crystal display of the dashboard unit; the digital audio selection comprising one or more of volume control and order of play; wherein the system is designed to play more than 200 hours of music from a single source of digital audio content; wherein the remote control device is attached to a steering wheel of the automobile; wherein the voice activated input further comprises a microphone attached to one or more of a visor and a steering wheel of the automobile; further comprising a parallel port for connecting the central processing unit and the dashboard unit for communication; wherein the storage device is removable for interaction with a remote computer; wherein the one or more digital audio selections comprises at least a particular musical selection within a collection of digital audio content in MP3 format; and wherein the voice activated input device operates as a voice recognition device wherein one or more specific users are authorized to control the system via the input unit.

The accompanying drawings, which are incorporated in and constitute a part of this specification, illustrate various embodiments of the invention and, together with the description, serve to explain the principles of the invention.

BRIEF DESCRIPTION OF THE DRAWINGS

The present invention can be understood more completely by reading the following Detailed Description of the Invention, in conjunction with the accompanying drawing, in which.

DETAILED DESCRIPTION OF THE INVENTION

Figure 1:
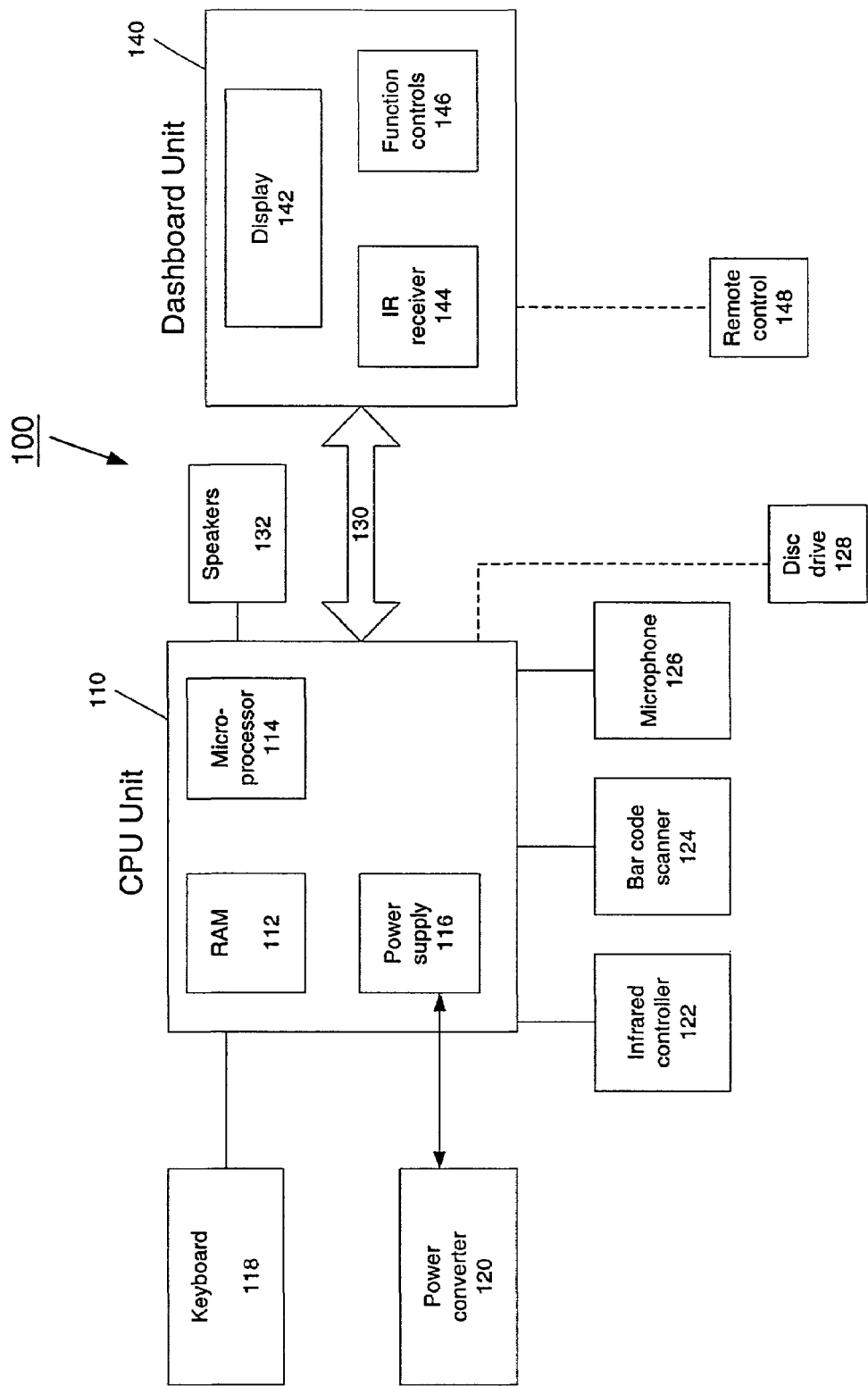
FIG. 1 is a diagram of a voice activated system for delivering digital audio content in MP3 format in an automobile, according to an embodiment of the present invention.

The following description is intended to convey a thorough understanding of the invention by providing a number of specific embodiments and details involving a voice-controlled system for providing digital audio content. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

FIG. 1 is a diagram of a voice activated system for delivering digital audio content in an automobile, according to an embodiment of the present invention. The system 100 of the present invention may deliver digital audio content in any format, including MP3 format. The system 100 comprises a central processing unit (CPU) unit 110 that includes a microprocessor 114 programmed to decode and deliver digital media, such as MP3s and ebooks, to a listener. The CPU unit 110 also includes Random Access Memory (RAM) 112 and a power supply 116. Other features and functionality may be available as well. A storage device, such as a disc drive 128, may be implemented. The storage device may include a "plug-in" unit, such as a hard disc drive 128, that may be removed and inserted into a home computer for downloading media, updating software and performing other functions. In another example, the hard disc drive 128 may be part of the CPU unit 110, wherein the CPU unit itself may be connected to a remote device, such as a home computer, via a network cable or other cable.

A power converter 120 may be connected to power supply 116 for efficient power transmission. The CPU unit 110 may be powered by the automobile itself or by an independent power source, such as batteries. In addition, the CPU unit 110 may receive inputs from a user via keyboard 118. A set of speakers 132 is provided for outputting audio selections. The CPU unit 110 may further include a text-to-voice engine for voice functionality. For convenience, the CPU unit 110 may be located in a trunk of the automobile, under the seat, in the backseat or other location within the automobile. One example of an operating system for the CPU unit 110 may include Windows 98 Lite™.

The system 100 may be controlled by a variety of different inputs for ease, flexibility and safety while maneuvering an automobile. In particular, CPU unit 110 may receive input by a combination of input devices, such as a voice-based input device, a set of function controls, a remote control, and a bar code scanner. The present invention integrates a voice-based input device (e.g., microphone 126) that interfaces with the CPU unit 110. The voice-based device is operative to control in a hands-free manner, for example, the selection of the media to be delivered and the volume at which the media is delivered. For example, voice commands may include begin, stop, pause, play, select a song, next, previous, toggle the randomizer, etc. Other functions and options may be voice controlled. A microphone 126 may serve as the voice-based input device. The microphone 126 communicates user commands to the CPU unit 110. The microphone 126 may be located on a visor, steering wheel, dashboard unit 140 or other location proximate to the driver.

According to another embodiment, the voice-based input device may operate as a voice recognition device thereby limiting the ability to control the digital audio media to one or more specific users who have been registered with the system or are otherwise known to the system. In another embodiment, the CPU unit 110 may speak the name of the song (or other information) whenever the track (e.g., song) is changed or whenever the CPU unit is otherwise prompted.

According to an embodiment of the present invention, voice functionality may be provided by implementing a plug-in for an audio software (e.g., Winamp™). Programming the plug-in may involve creating a voice recognition algorithm and interfacing the plug-in to the audio software. Voice recognition may be provided by a speech engine, such as Microsoft Speech™ Application Programmers Interface (API) version 5. This API contains a set of functions to control a central engine (e.g., CPU unit), which performs a variety of complex recognition tasks. To recognize commands, a grammar may be created to inform the engine of particular words and/or phrases. A grammar contains a set of rules specified words and/or phrases to be recognized. On recognition of a word or phrase, a message is sent to the application containing an identifier and other information of a matched rule. Various messages may be sent to the audio software, corresponding to the action intended by the matched rule. The grammar may be programmed to include rules for a variety of commands, as well as placeholders for a dynamic select song command, which may be changed on runtime to include some or all songs on a playlist, for example. An initialization routine may query the audio software for the size of the playlist and then step through each song on the playlist, adding the title and name of the song (which may be stripped of special characters) to the voice recognition algorithm.

A display and control unit (e.g., dashboard unit 140) of the present invention is suitable for mounting on the dashboard of an automobile and provides an alternative to voice control of the system. A display 142 of the dashboard unit 140 may also provide a scroll-through list of the available media and information about the media being played such as the title, the artist (or author), the volume at which it is being played and a sound spectrum analysis. Other information specific to the digital audio content may also be displayed. For example, if an ebook is the source of digital media, information related to the author, chapter title, or other relevant data may be displayed. The CPU unit 110 may communicate with the dashboard unit 140 through a parallel port 130 where data may be received and transmitted via parallel port 130. According to another embodiment, video data may be received by CPU unit 110 and displayed on display 142. Video data may include data from a DVD or other medium.

Another input option includes functional controls 146, which are located at dashboard unit 140. Functional controls may include a button for play, stop, next, previous and pause. Other functions, such as select a song, search (e.g., by title, artist, etc.), toggle and record, may also be implemented, in accordance with the present invention. Number keys may also be implemented to identify a track (e.g., a song) by number (or other identifier). In another embodiment, the display 142 itself may be touch sensitive to enable a user to control the digital audio content by pressing an icon or other graphic on the screen. Another option may include a cursor or mouse control for controlling the digital audio content. Other types of manual controls may be implemented.

Alternative devices for controlling the functionality of the system are also provided. Specifically, the system includes a remote control 148. The remote control 148 may be based on infrared, Radio Frequency (RF), microwave or other transmission method. A signal from the remote control 148 may be received by an infrared receiver 144, which may be located on or proximate to the dashboard unit 140. The remote control 148 may be attached (or removably attached) to the steering wheel, visor or other location proximate to the user. An infrared controller 122 may be in communication with CPU unit 110.

Another type of input device may include a bar code scanner 124. The bar code reader 124 is useful for, among other things, selection of a specific media to be delivered from a list, by someone (e.g., a passenger) who is unfamiliar with the contents of the storage device. For example, a user may scan a track number on a printed list and the system will deliver the audio content associated with the track number.

According to another embodiment of the present invention, the CPU unit 110 may interact with a global positioning system (GPS), vehicle security system, and/or entertainment devices (e.g., DVD player, CD player, etc.). The CPU unit 110 may also include wireless Internet connectivity for receiving remote data. For example, the CPU unit 110 may receive and provide specific data (e.g., weather and traffic reports) for display on dashboard unit 140 to the user. The specific data may be based on the user's location (based on GPS data), user input (e.g., an intended destination) or other data. In addition, the CPU unit 110 may interface with an automobile's computer to provide security with voice recognition. Other functionality, interactivity and services are available in accordance with the present invention.

The present invention enables a user to listen to a wide range of music (or other audio media) for an extended period of time (e.g., over 200 hours) without having to constantly change the audio source. As a result, the user is not required to transport a stack of CDs just to hear a desired collection of music. Rather, the present invention is able to provide over 200 hours of continuous play in portable format. A voice activated input further enables a user to control the music (or other audio) selection safely and easily without having to take the their eyes off the road, thereby promoting safety. When permissible (e.g., during a stoplight or when the automobile is in a park position), the user may easily program the play order, view relevant data and perform other operations via function controls (e.g., buttons), remote control, bar code scanner, as well as voice activated commands.

While there are several other commercial options for providing digital audio content, such as MP3s, in an automobile, the current solutions fail to provide the features of the system of the present invention at a low cost. In addition to capacity, the present invention is voice activated, includes a larger LCD and a remote control, all for less than it would cost for a top of the line CD Changer and Head unit.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A system for providing digital audio content in an automobile, the system comprising:
   a central processing unit comprising (a) a microprocessor for decoding and delivering digital audio content from a single source of MP3 content; (b) a storage device for storing the digital audio content; (c) a random access memory for storing temporary data for running one or more application programs; (d) a power supply for providing power to the central processing unit, wherein the central processing unit is located in the automobile;
   an input unit comprising (e) a set of function controls for enabling a user to select one or more digital audio selections; (f) a receiver for receiving input from a remote control device for selecting one or more digital audio selections; (g) a voice activated input device for receiving voice commands from a user for selecting one or more digital audio selections; wherein the voice activated input device further comprises a microphone attached to one or more of a visor and a steering wheel of the automobile and wherein the voice activated input device operates as a voice recognition device wherein one or more specific users are authorized to control the system via the input unit; and (h) a bar code scanner for selecting one or more digital audio selections; and wherein the input unit is located proximate to a driver's seat of the automobile; and
   a dashboard unit comprising a liquid crystal display for displaying media data related to the digital audio content in response to the digital audio selection, wherein the dashboard unit is mounted on a dashboard of the automobile at a location within the user's reach;
   wherein the digital audio content further comprises video data for display on the liquid crystal display of the dashboard unit.

2. The system of claim 1, wherein the digital audio content further comprises an electronic book.

3. The system of claim 1, wherein the digital audio selection comprises one or more of volume control and order of play.

4. The system of claim 1, wherein the system is designed to play more than 200 hours of music from the single source of digital audio content.

5. The system of claim 1, wherein the remote control device is attached to a steering wheel of the automobile.

6. The system of claim 1, further comprising a parallel port for connecting the central processing unit and the dashboard unit for communication.

7. The system of claim 1, wherein the storage device is removable for interaction with a remote computer.

8. The system of claim 1, wherein the one or more digital audio selections comprises at least a particular musical selection within a collection of digital audio content in MP3 format.

* * * * *